Oct. 11, 1966  C. LAUXEN ET AL  3,278,790
ARC LAMP EXHAUST FLUE
Filed Nov. 19, 1963
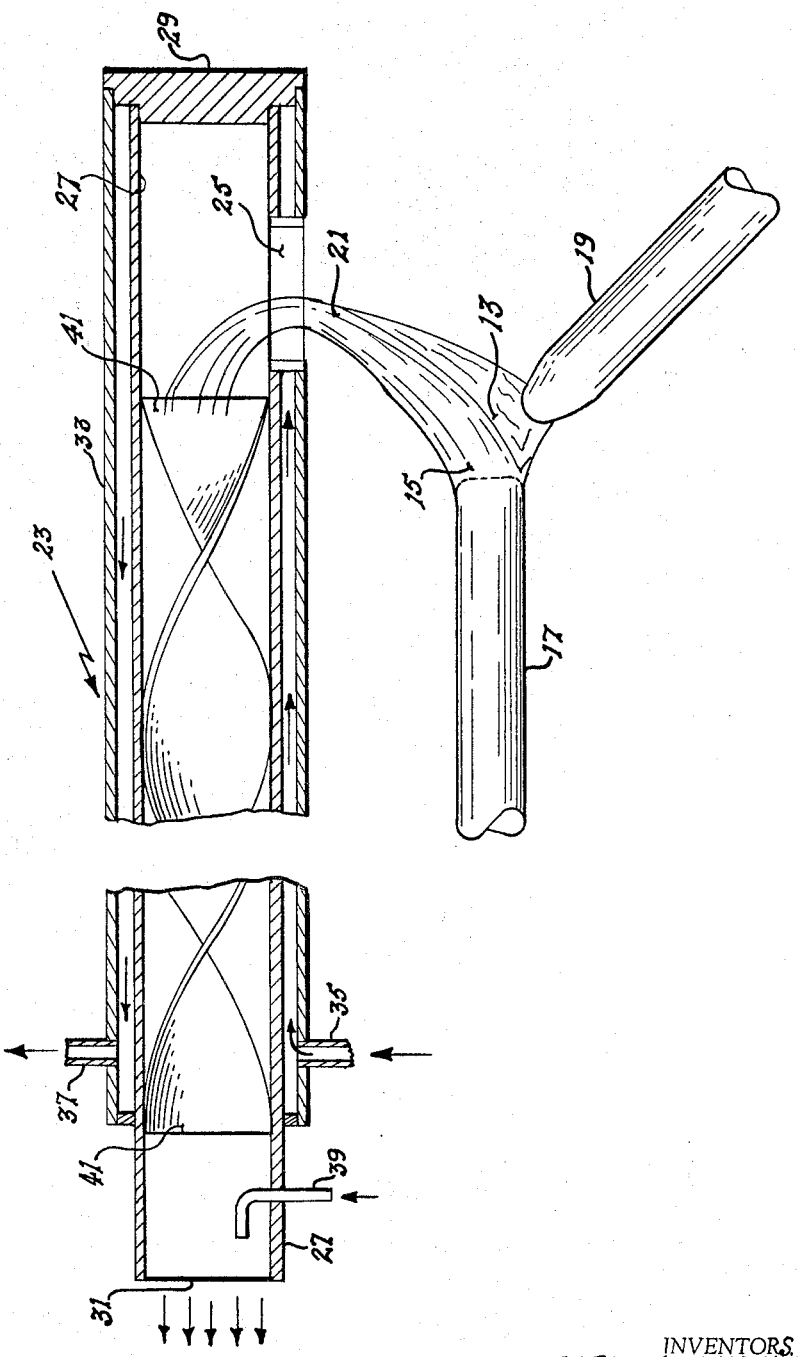
INVENTORS
CARL LAUXEN and
JOHN B. LONG, Jr.
BY Wade Loontz
and Arsen Tashjian
ATTORNEYS

3,278,790
ARC LAMP EXHAUST FLUE

Carl Lauxen, Haddonfield, N.J., and John B. Long, Jr., New Concord, Ohio, assignors to the United States of America as represented by the Secretary of the Air Force
Filed Nov. 19, 1963, Ser. No. 324,902
1 Claim. (Cl. 314—26)

This invention relates to a device for cooling an arc lamp in the flame area and conducting away the products of combustion produced by the lamp. More particularly, the invention is concerned with removing the heat and smoke created by the burning electrodes in order to prevent damage to the electrode handling and feeding mechanism and to prevent contamination of optical system so that the efficiency and reflectivity of the arc lamp would not be impaired.

During the operation of a carbon arc lamp, especially when operated for extended periods of time, certain by-products of combustion such as gases and a powdery talcum-like material are produced. If these by-products, particularly the powdery material, are not removed from the area of the lamp housing immediately after formation, they can be expected to precipitate on all available surfaces such as reflectors and optical elements thereby greatly reducing the efficiency and reflective capabilities of the lighting system. When used intermittently, such as in a theater type carbon arc lamp, there are usually two lamps available so that one lamp can be cleaned and made ready for use while the other lamp is in use showing the motion picture film. Thus, the problem of contamination is not a great one in the above example.

During continuous operation, however, the combustion by-products cannot be effectively removed from the lamp surfaces once they have formed thereon. Therefore, under these operating conditions it is essential that the contaminating material be removed from the lamp before it has an opportunity to precipitate on the lamp surfaces. The present invention provides apparatus which is arranged to remove the hot gases and the powdery material that is formed when the electrodes are consumed in the lamp.

Accordingly, it is an object of the present invention to provide an arc lamp which is capable of being operated for extended periods of time without shutting down for cleaning and servicing.

Another object of the invention is to provide a means for exhausting the by-products of combustion of the electrodes in an arc lamp before any contamination of the operating elements within the lamp can occur.

A further object of the present invention is to provide a flue through which the combustion by-products of an operating carbon arc lamp can be exhausted and which is capable of withstanding the extremely high temperatures encountered during normal operation.

A still further object of the invention is to provide a flue having a double wall with coolant passing between the inner and outer walls.

Still another object of the invention is to provide a flue wherein the intake portion is at lower than atmospheric pressure in order to draw the combustion by-products thereinto.

Another still further object of the invention is to provide a flue having a substantially non-corrosible helical element inserted therein for increasing the turbulence of the gases while passing therethrough in order to allow more heat to be conducted to the coolant passing between the walls of the flue.

These and other objects, features and advantages will become more apparent after considering the following detailed description taken in connection with the illustrative embodiment in the accompanying drawing which is a diagrammatic view of one embodiment of the invention as utilized with a high-intensity continuous operating arc lamp.

Referring now to the drawing, an arc 13 is struck between the crater 15 of the positive electrode 17 and the negative electrode 19. When operated at high current densities, a tail flame 21 of substantial length is created which contains the combustion by-products generated by the flaming electrodes. An exhaust flue generally designated by the reference numeral 23 has a forward end provided with an intake opening 25 positioned near the arc 13 for receiving the tail flame 21 along with the combustion by-products contained therein.

The exhaust flue 23 is comprised of an elongated tubular inner wall member 27 closed at its forward end by the plug 29. The rearward end of the flue 23 is open and exhausts into the atmosphere through the opening 31. An elongated outer wall member 33 is concentrically disposed around the inner wall member 27 and is sealed thereto. An inlet 35 is provided near the rearward end of the outer wall member 33 for receiving a coolant which circulates through the area between the inner and outer walls and then discharges through the outlet 37.

Near the rearward end of the flue 23, a gaseous substance such as air under compression is introduced through the inner wall 27 by means of an injector 39. The introduction of compressed air in this region acts to create a current flowing toward the rearward end and through the opening 31. This creates a pressure drop in the forward end of the flue 23 at the intake opening 25 thereby operating to draw the tail flame 21 of the arc 13 thereinto. A twisted member 41 preferably fabricated from a heat and corrosion resistant material such as stainless steel may be inserted inside the flue adjacent to the inner wall 27 and serves to add turbulence to the heated gas stream carrying the combustion by-products causing a greater portion thereof to contact the cooled inner wall 27 and thereby safely dissipate the heat generated by the burning electrodes.

It is readily apparent that the direction of flow of the coolant disposed between the inner wall 27 and the outer wall 33 may be reversed without materially changing the operation of the device. If this were done the inlet 35 would function as an outlet while the outlet 37 would admit the coolant into the water jacket. Also, the intake opening 25 may, alternatively, be placed at the downstream terminal end of the exhaust flue 23, that is, the plug 29 may be omitted leaving an opening in its place or the flue intake may consist of a series of smaller openings strategically placed near the arc 13.

In operation, the arc 13 is struck when the positive electrode 17 is given a positive charge and the negative electrode 19 is given a corresponding negative charge. When operating at high intensity with a high current density, a long tail flame 21 is generated containing extremely hot gases and powdery by-products of combustion which would normally be expected to precipitate on various optical and reflective surfaces inside the lamp housing. However, the present invention provides the exhaust flue 23 which carries away the heat and harmful by-products of combustion.

The exhaust flue 23 is provided with an intake opening 25 which allows the tail flame 21 to enter thereinto. A stream of compressed gaseous fluid directed downstream is introduced into the rearward portion of the flue 23 and operates to effectively reduce the pressure at the intake opening 25 causing the tail flame 21 to be drawn into the flue and toward the downstream end. A twisted steel member 41 is inserted in the flue 23 and causes the hot gases in the tail flame 21 to travel along a spiral course thereby inducing contact with the inner wall 27 during passage through the flue.

The flue itself is comprised of an inner wall 27 and an outer wall 33 with a coolant passing therebetween. The coolant operates to carry off a large portion of the heat from the gases and at the same time prevent damage to the flue 23 because of the intense heat generated by the arc lamp. Under actual conditions of lamp operation at 160 amperes and 77 volts, temperatures in the vicinity of 6000° centigrade may be created in the arc itself which would be expected to cause any single walled flue of presently known material to melt or be severely deformed. The herein disclosed double-walled exhaust flue 23 having a circulating coolant between the walls, reduces the temperature at the surface of the outer wall 33 to a safe level of around 15° centigrade.

It will be understood by those skilled in the art that the invention has been described with reference to a particular embodiment and that various changes and modifications may be made in the device without departing from the true spirit and scope of the invention.

Having thus described our invention, what we claim as new and desire to secure by Letters Patent of the United States is:

In an exhaust system for an arc lamp having burning electrodes therein, an axially oriented elongated tubular flue member having its forward end completely closed and its rearward end open, said flue member having an intake opening in its sidewall near the point of contact of the burning electrodes and an exhaust at the open rearward end, an outer wall member positioned in spaced relation concentrically along said tubular flue to form a fluid-tight compartment therearound, said outer wall member having inlet and outlet openings near the rearward end thereof for the entrance and exit of a coolant fluid into and out of said fluid-tight compartment, jet-pump means for injecting pressurized gas in a downstream direction near the open rearward end of said tubular flue member causing a downstream air flow and pressure drop at the intake opening in said tubular member to draw the heated gas carrying combustion by-products from the burning electrodes thereinto, and a twisted metallic strip of substantially non-corrosive material disposed within said tubular member causing the combustion by-products carried by the heated gas stream passing therethrough to follow a spiral path and increase the cooling effect of the exhaust system.

References Cited by the Examiner

UNITED STATES PATENTS

| 1,098,573 | 6/1914 | Hauser | 219—305 |
| 2,409,550 | 10/1946 | Dobkowski | 219—120 |

FOREIGN PATENTS

| 296,057 | 6/1929 | Great Britain. |
| 56,221 | 5/1944 | Netherlands. |

JOSEPH V. TRUHE, *Primary Examiner.*

RICHARD M. WOOD, *Examiner.*